(12) United States Patent
Horiuchi et al.

(10) Patent No.: US 9,021,433 B2
(45) Date of Patent: Apr. 28, 2015

(54) SOFTWARE DEVELOPMENT SUPPORT METHOD, PROGRAM AND DEVICE

(71) Applicant: International Business Machines Corporation, Armonk, NY (US)

(72) Inventors: Yoshio Horiuchi, Tokyo (JP); Kenji Uchida, Tokyo (JP); Masaki Wakao, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 13/854,345

(22) Filed: Apr. 1, 2013

(65) Prior Publication Data

US 2013/0268910 A1 Oct. 10, 2013

(30) Foreign Application Priority Data

Apr. 5, 2012 (JP) ................................. 2012-086548

(51) Int. Cl.
*G06F 9/44* (2006.01)
*G06Q 10/06* (2012.01)
*G06Q 10/10* (2012.01)

(52) U.S. Cl.
CPC *G06F 8/71* (2013.01); *G06Q 10/06* (2013.01); *G06Q 10/103* (2013.01)

(58) Field of Classification Search
CPC ............. G06F 8/30; G06F 8/70; G06F 8/71; G06Q 10/06; G06Q 10/103
USPC .................. 717/101–103, 106–113, 120–123
See application file for complete search history.

(56) References Cited

FOREIGN PATENT DOCUMENTS

JP 2007272655 A 10/2007

OTHER PUBLICATIONS

Htun, "The Annotators' Perspective on Co-authoring with Structured Annotations", 2007, Master Thesis, The University of British Columbia, Canada, 130 pages.*
Sean, "Generate From Usage in Visual Studio 2010", Jun. 2010, retrieved from http://stuff.seans.com/2010/06/09/generate-from-usage-in-visual-studio-2010/ , pp. 1-6.*
"Generate From Usage" [online] Visual Studio 2012, © Microsoft 2013 [retrieved Apr. 1, 2013] retrieved from the Internet: <http://msdn.microsoft.com/en-us/library/dd409796(d=printer).aspx>, 10 pgs.
"How to Automatically Generate a Method Stub in Visual Studio 2005" [online] Developer@Adjust, devadjust.exblog.jp, Nov. 2, 2006 [retrieved Apr. 1, 2013] retrieved from the Internet: <http://devadjust.exblog.jp/4115911/>, 6 pgs.
"Thorough Commentary Web/DB Programming—(Automatic Code Generation) product from usage—Visual Studio 2010," [online] © 2008-2013 Keisuke Oyama [retrieved Apr. 1, 2013] retrieved from the Internet: <http://keicode.com/dotnet/visual-studio-2010-generate-from-usage.php>, 2 pgs.

* cited by examiner

*Primary Examiner* — Ted T Vo
(74) *Attorney, Agent, or Firm* — Cuenot, Forsythe & Kim, LLC

(57) ABSTRACT

Supporting communications between developers of interdependent tasks of software parallel development can include inserting metadata, which expresses the existence of dependent code on which a first source code depends, into the first source code, at a time a first owner creates the first source code. A task to create the dependent code is created in response to detection of the metadata. Metadata expressing a second owner who owns the task of creating the dependent code and a status of the task is inserted into the first source code.

12 Claims, 15 Drawing Sheets

```
public class Foo {
    public int getResult(int in1, int in2) {
        // TODO Auto-generated method stub
        return 0;
    }
}
```

Fig. 14

703
```
public class Foo {
    /*
     * @requested
     * creator: andy          ~24
     * work item: 1234
     */
    public int getResult(int in1, int in2) {
        int out = in1 + in2;

return out;
    }
}
```

SOFTWARE DEVELOPMENT SUPPORT METHOD, PROGRAM AND DEVICE

CROSS-REFERENCE TO RELATED APPLICATIONS

This application claims the benefit of Japan Application Number 2012-086548 filed on Apr. 5, 2012, which is fully incorporated herein by reference.

BACKGROUND

This specification relates to systems that manage the progress of software development projects. During parallel development by several creators, with the producing of a single requirement there can be reliance on one developer to supervise component D and on another developer to supervise component P.

Formerly, in such a situation, the developer of component D makes contact with the developer of component P using a human communications system such as telephone, email or fax, in order to urge rapid completion of the operation.

However, an operation that requires component D developer to frequently prompt of the other developer, while being attentive to the dependee progress state, can place a psychological burden on component D developer. Furthermore, when component D developer faces heavy stress due to responsibility for several operations, the developer may forget to prompt component P developer; and, in the worst case, this may lead to a situation in which component D development will not be completed by the deadline.

BRIEF SUMMARY

A system for supporting communications between developers of interdependent tasks of software parallel development includes a processor programmed to initiate executable operations. The executable operations include detecting a source code checked into a common repository that centrally manages source code under development, judging whether or not a prescribed annotation has been inserted into the checked in source code, creating a stub code corresponding to a temporary interface described in the source code into which the prescribed annotation has been inserted, and checking into the common repository. The executable operations also include creating a task to implement the temporary interface and to register the task with a task management device that manages parallel development tasks, and acquiring a task ID of the task from the task management device. The executable operations further include inserting a prescribed annotation describing the task ID acquired from the task management device to the stub code, and describing the task ID in the annotation that has been inserted in the checked in source code. A comment related to the source code is appended to the task that has the task ID described in the annotation of the checked in source code.

A method of supporting communications between developers of interdependent tasks of software parallel development includes detecting a source code checked into a common repository that centrally manages source code under development, judging whether or not a prescribed annotation has been inserted into the checked in source code, creating a stub code corresponding to a temporary interface described in the source code into which the prescribed annotation has been inserted, and checking into the common repository. The method also includes creating a task to implement the temporary interface and to register the task with a task management device that manages parallel development tasks, and acquiring a task ID of the task from the task management device. The method further includes inserting a prescribed annotation describing the task ID acquired from the task management device to the stub code, and describing the task ID in the annotation that has been inserted in the checked in source code. A comment related to the source code is appended to the task that has the task ID described in the annotation of the checked in source code.

A method of supporting communications between developers of interdependent tasks of software parallel development includes inserting metadata, which expresses the existence of dependent code on which a first source code depends, into the first source code, at a time a first owner creates the first source code, and creating a task to create the dependent code, in response to detection of the metadata. The method further includes inserting, into the first source code, metadata which expresses a second owner, who owns the task of creating the dependent code, and a status of the task.

A computer program product for supporting communications between developers of interdependent tasks of software parallel development includes a computer readable storage medium having program code stored thereon. The program code is executable by a processor to perform a method. The method includes detecting a source code checked into a common repository that centrally manages source code under development, judging whether or not a prescribed annotation has been inserted into the checked in source code, creating a stub code corresponding to a temporary interface described in the source code into which the prescribed annotation has been inserted, and checking into the common repository. The method also includes creating a task to implement the temporary interface and to register the task with a task management device that manages parallel development tasks, and acquiring a task ID of the task from the task management device. The method further includes inserting a prescribed annotation describing the task ID acquired from the task management device to the stub code, and describing the task ID in the annotation that has been inserted in the checked in source code. A comment related to the source code is appended to the task that has the task ID described in the annotation of the checked in source code.

BRIEF DESCRIPTION OF THE SEVERAL VIEWS OF THE DRAWINGS

FIG. 6 is a drawing that shows the stub code created by the stub code creation unit.

FIG. 14 is a drawing that shows the working code for which a temporary interface has been mounted.

DETAILED DESCRIPTION

Figure 1:
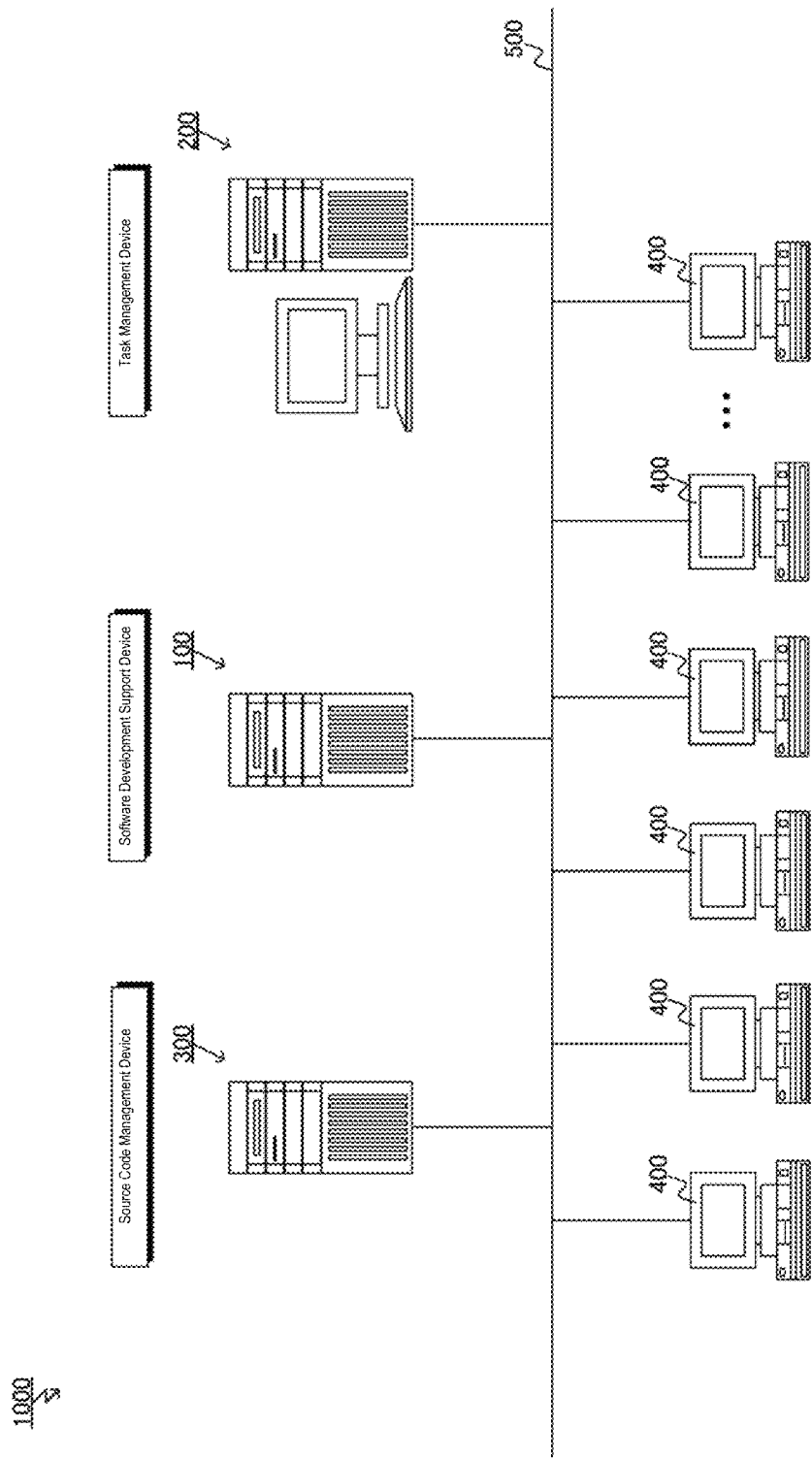
FIG. 1 is a drawing that shows a software development system that includes the software development support device of this embodiment.

This invention is one for which the above described problems with the former technology have been considered, and it has as its purpose the offering of a new method for supporting communications between developers having interdependent tasks within parallel development of software.

As a result of having diligently investigated methods for supporting communications between developers having interdependent tasks, the inventors arrived at this invention by devising a structure that systematically executes communications between developers through the use of an annotation inserted to the working code of the dependent.

Specifically, by use of this invention there is offered a device, which is a software development support device connected to a task management device that manages the tasks of software parallel development and to a common repository that centrally manages the source code under development, comprising: a check-in detection unit for detecting the source code being checked into the common repository; an annotation analysis unit for judging whether or not a prescribed annotation is inserted to the source code that has been checked in; a stub code creation unit for creating a stub code that corresponds to a temporary interface described in the source code into which the prescribed annotation is inserted, and for checking into the common repository; a task creation unit for creating a task that implements the temporary interface and for registering the task with the task management device, and for acquiring the task ID of the task from the task management device; an annotation creation unit for inserting a prescribed annotation that has described the task ID acquired from the task management device to the stub code, and for describing the task ID in the annotation that has been inserted in the checked in source code; and a comment append unit for appending a comment, related to the source code, to the task that has the task ID described in the annotation of the checked in source code.

As described above, by use of this invention there is offered a new method for supporting communications between developers having interdependent tasks. Through use of the invention, the dependent developer is able to advance operations at a self-determined pace, without concern for the dependee progress state.

The following section describes this invention by using the embodiment shown in the drawings, but this invention is not limited to the embodiment shown in the drawings. Furthermore, regarding the following referenced drawings, the same symbols are used for common elements and explanations are omitted for convenience.

FIG. 1 shows software development system 1000, into which software development support system 100, being the embodiment of this invention, has been incorporated. Software development system 1000 includes task management device 200, source code management device 300, software development support device 100, and a plurality of operation implementation client terminals 400; each of these devices is connected through network 500, which represents a network such as a LAN, VPN, or the Internet.

Figure 2:
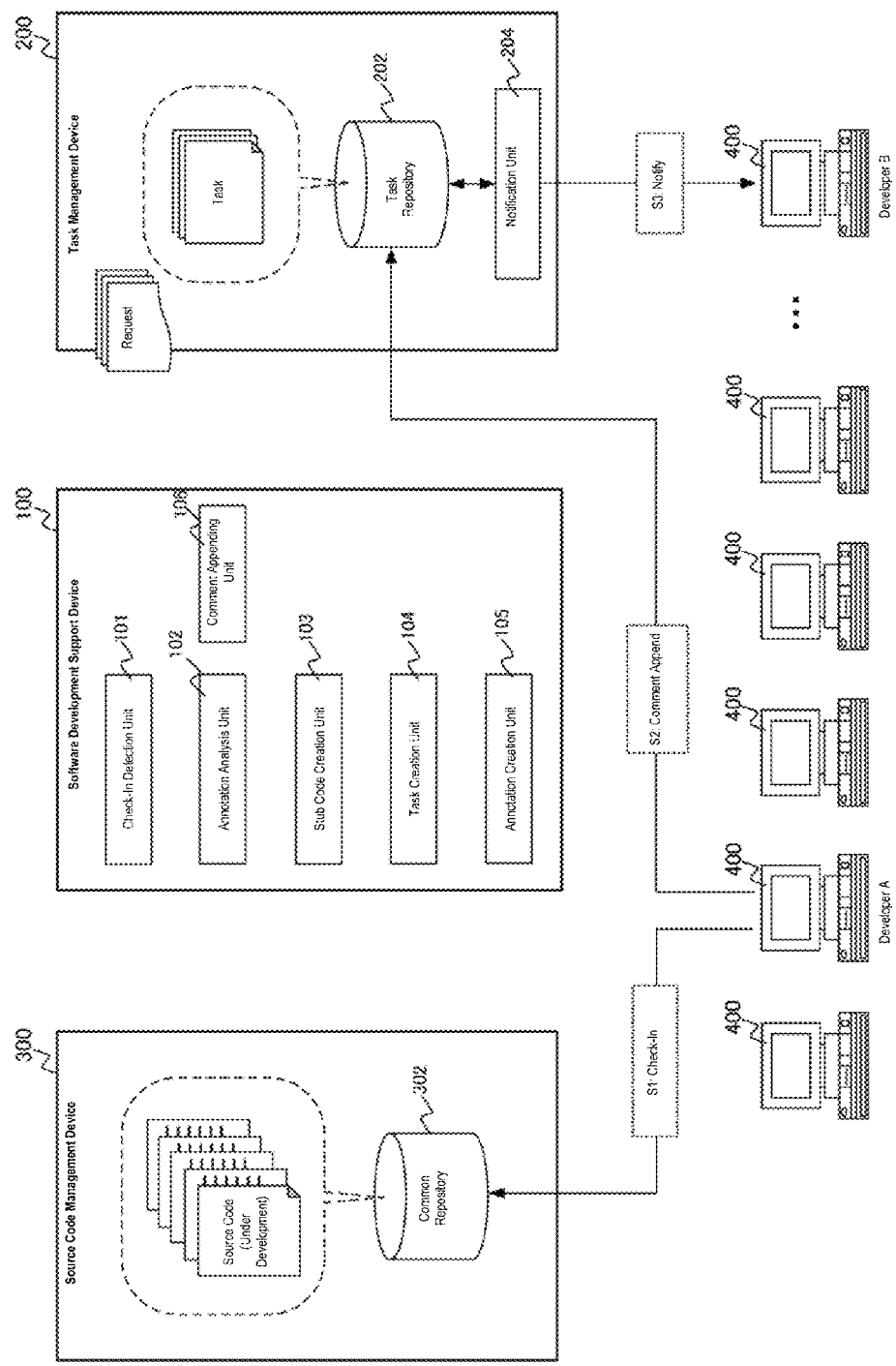
FIG. 2 is a function block drawing of the software development support device of this embodiment.

FIG. 2 shows function blocks for software development support device 100 of this embodiment, as well as the other devices that structure software development system 1000. Before explaining software development support device 100 of this embodiment, the functions of a conventional software development system 1000, being the introduction target for software development support device 100, is described based on FIG. 2.

Task management device 200 is a device for controlling the progress of projects by managing development request specifications as well as operation tasks and trouble reports related to each request specification, and it is structured by task repository 202 for registering tasks and by notification unit 204. Notification unit 204 continuously monitors task repository 202, and, in response to an event generated for a task, it sends needed information to the person related to that task.

Source code management device 300 is a device for performing unified management of code information for each process during development, and it is structured by common repository 302. Common repository 302 is a common repository region for the development team that is structured by a development environment and by a test build that can be referenced, and each related person executes a successive update to place iteration information (working code) for his or her working content in common repository 302. (Hereafter, this action is called "check-in".)

Normally, a developer is required to report the operation progress state to task management device 200 when performing check-in of a working code. With the example shown in FIG. 2, after developer A performs check-in to common repository 302 (S1), he appends a comment related to the progress state of the task corresponding to the checked-in working code (S2). At this time, notification unit 204 detects that a comment has been appended to the task, and it notifies developer B, who is related to that task, of the information (S3). Regarding functions other than these possessed by task management device 200 and source code management device 300, there is no direct relationship to the intent of this invention, and therefore descriptions other than those above are omitted.

The following section describes the structure of software development support device 100 of this embodiment. Software development support device 100 is structured of check-in detection unit 101, annotation analysis unit 102, stub code creation unit 103, task creation unit 104, annotation creation unit 105, and comment append unit 106.

Check-in detection unit 101 is a functional component for continuously monitoring common repository 302 of source code management device 300 and for detecting and acquiring the source code for which check-in was performed at common repository 302. Annotation analysis unit 102 is a functional component for analyzing the annotation inserted to within the source code acquired by check-in detection unit 101.

Stub code creation unit 103 is a functional component for creating a stub code that corresponds to a temporary interface (described hereafter) included in the source code of the dependent. Task creation unit 104 is a functional component for creating a task that will mount the temporary interface and for registering that task in task management device 200.

Annotation creation unit 105 is a functional component for inserting a prescribed annotation for the stub code created by stub code creation unit 103 and for the source code of the dependent. Comment append unit 106 is a functional component for creating a comment related to stated source code, based on information offered by the annotation that was inserted into the source code for which check-in was performed at common repository 302, and for appending the created comment to a task specified by the annotation.

While the above section described the structure of software development support device 100 of this embodiment, the following section describes, based on a specific example, the mechanism for systematic communications between developers produced by software development support device 100 of this embodiment.

Figure 3:
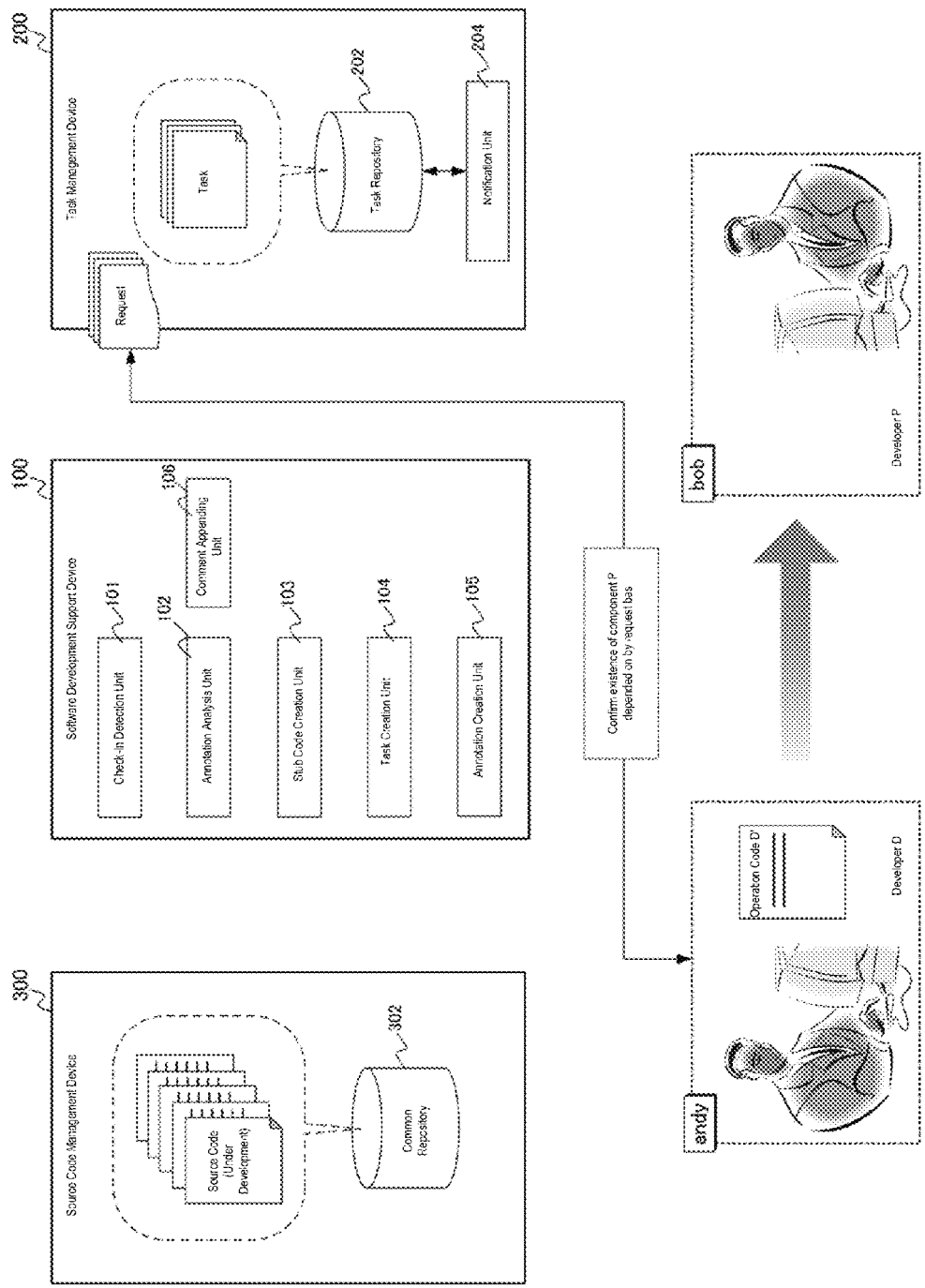
FIG. 3 is a concept drawing for explaining the functions of the software development support device of this embodiment.

FIG. 3 is referenced first. With the example shown in FIG. 3, for a requirement during design, component D is defined as being dependent on component P. The developer of component D, "andy", references the requirement specification controlled by task management device 200 and learns that the function "getResult" used by component D has not yet been created.

Figure 4:
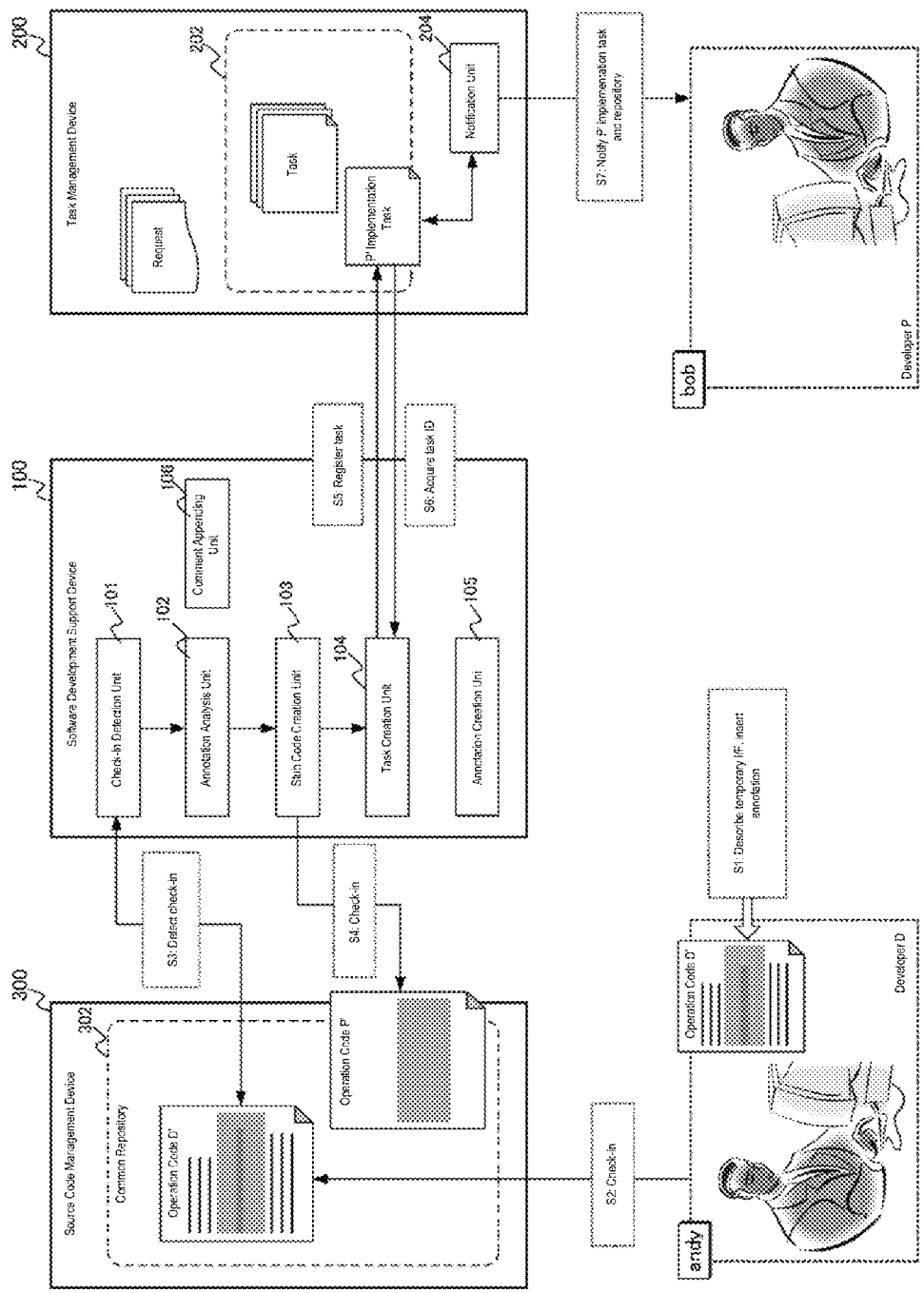
FIG. 4 is a concept drawing for explaining the functions of the software development support device of this embodiment.

The following section provides a description by referencing FIG. 4. "andy", who knows that function "getResult" has not yet been created, describes a temporary interface within the corresponding working code within component D (specifically, the code that uses the function "getResult"), and inserts a prescribed annotation into the temporary interface (S1).

Figure 5:
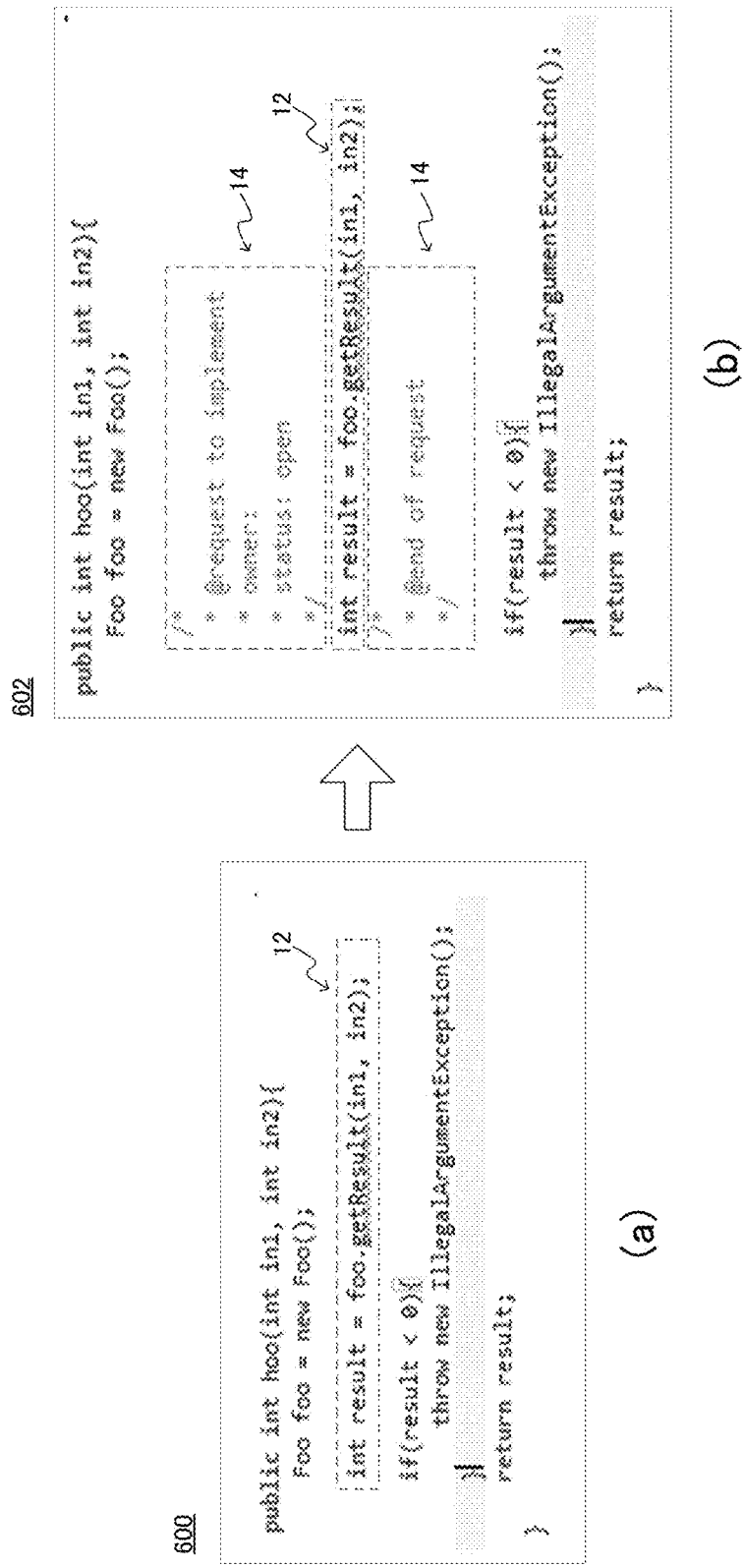
FIG. 5 is a drawing that shows the working code into which an annotation has been inserted.

FIG. 5 (a) shows working code 600 (working code D') of component D in which temporary interface 12 is described. Here, the temporary interface is provisional code (class creator, function call, etc.) for calling the dependee source code presumed by the developer of the dependent source code. With the example in FIG. 5 (a), the API "class Foo int result=foo.getResult", which is expected to be provided by component P, is described as temporary interface 12.

"andy" inserts an annotation into the temporary interface 12 that has been described. With the embodiment, the annotation signifies metadata provided to temporary interface 12 as a comment, and it includes a text string of a predetermined format, for example, as an identifier. FIG. 5 (b) shows working code 602 (working code D') of component D for which annotation 14 has been inserted into temporary interface 12. With annotation 14 exemplified in FIG. 5 (b), the text string "@request to implement", for example, is described as the identifier; the task owner, who will implement the temporary interface, are prepared as properties; and, a default value (owner: blank (operator not determined); status: open (not started)) is set for each property. Moreover, with the embodiment, it is acceptable to offer to the user a suitable UI for inserting the annotation in a predetermined correct format.

The following section continues the explanation by returning to FIG. 4. "andy" checks into common repository 302 using working code 602 (working code D') into which the annotation has been inserted (S2). After following the above procedures, "andy" is able to continue work at his own pace, without frequently querying task management device 200 about the progress status of component P.

On the other hand, check-in detection unit 101 of software development support device 100 constantly monitors common repository 302, as described previously; it detects the check-in by "andy" and it acquires (copies) that working code 602 (working code D') (S3).

Annotation analysis unit 102 analyzes working code 602 acquired by check-in detection unit 101 and judges whether or not a task ID is described within inserted annotation 14. In this case, a task ID is not described within annotation 14 of working code 602 shown in FIG. 5 (b), and therefore it requests creation of a task code from stub code creation unit 103.

In response to the above described request, stub code creation unit 103 extracts temporary interface 12 "int result=foo.getResult (in1, in2);" provided by annotation 14, and it creates a stub code as an implementation class for temporary interface 12. FIG. 6 shows stub code 700 created by stub code creation unit 103. Stub code creation unit 103 checks into common repository 302 using created stub code 700 (working code P').

In response to having checked in stub code 700, task creation unit 104 creates a task for implementing temporary interface 12 (hereafter, called P' implementation task), and registers the task in task management device 200 (S5). At this time, task management device 200 registers software development support device 100 as the person related to P' implementation task. Furthermore, task creation unit 104 acquires from task management device 200 the task ID "1234" for the registered P' implementation task (S6).

In response to P' implementation task being registered, task management device 200 assigns P' implementation task to the component owner (the development leader, for example). The development leader assigns working code P' to "bob", and the owner of P' implementation task changes to "bob". In response to the owner changing to "bob", notification unit 204 notifies "bob", who is the P' implementation task owner, of the storage location for P' implementation task and the stub code.

Figure 7:
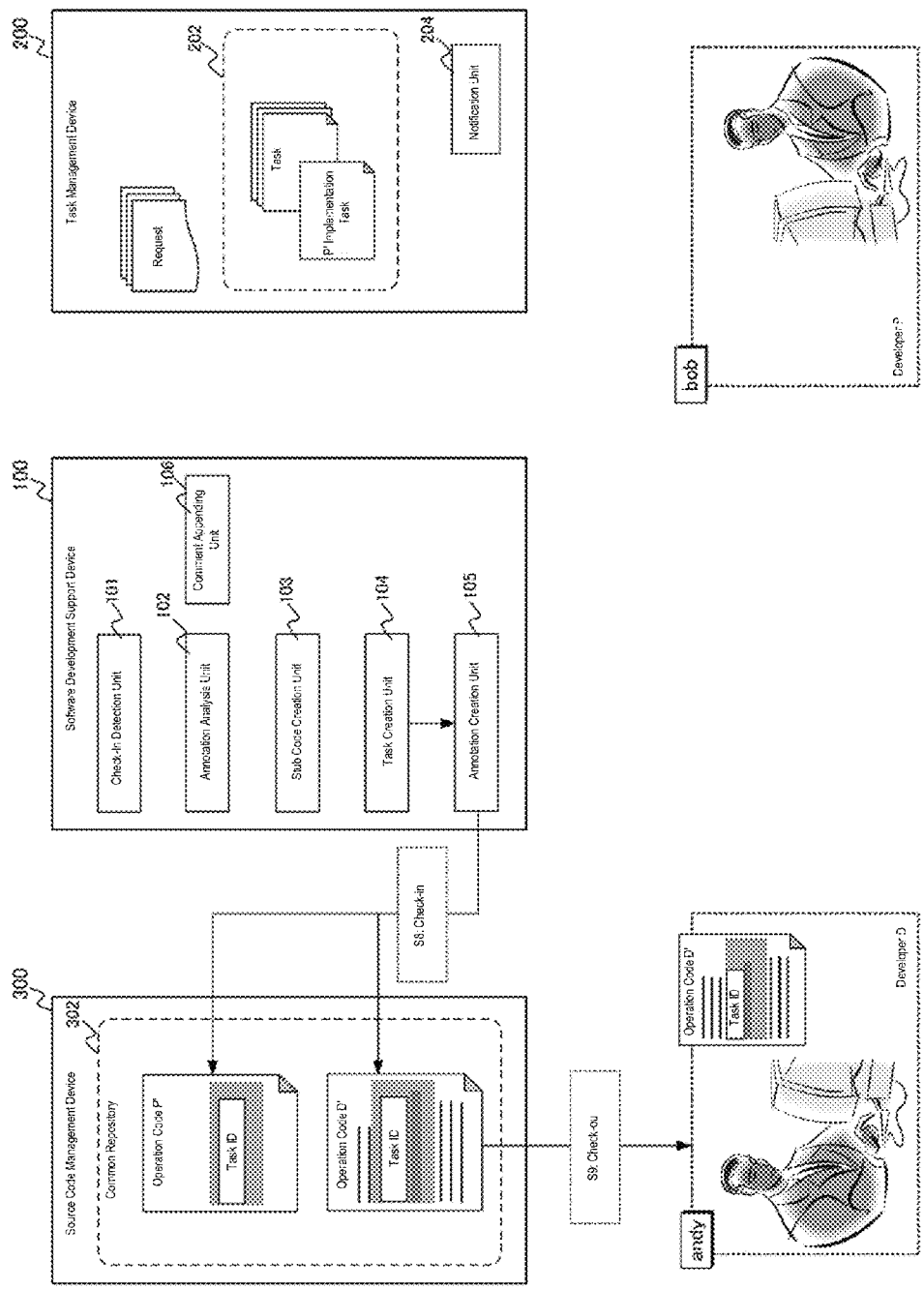
FIG. 7 is a concept drawing for explaining the functions of the software development support device of this embodiment.

The following section continues the description by referencing FIG. 7. In response to stub code 700 created by stub code creation unit 103, annotation creation unit 105 inserts the text string "@requested", for example, into the previously explained annotation, as an identifier. At this time, for the annotation, annotation creation unit 105 describes, as properties, the task ID "1234" acquired by task creation unit 104 as well as the creator who required implementation of the temporary interface.

In addition, annotation creation unit 105 describes task ID "1234", acquired by task creation unit 104, to annotation 14 inserted to working code 602 (working code D') of "andy", which was previously acquired by check-in detection unit 101.

Annotation creation unit 105 checks into common repository 302 using working code D' and working code P' (stub code) described with task ID "1234" (S4). The result is that the differences information is updated.

Figure 8:
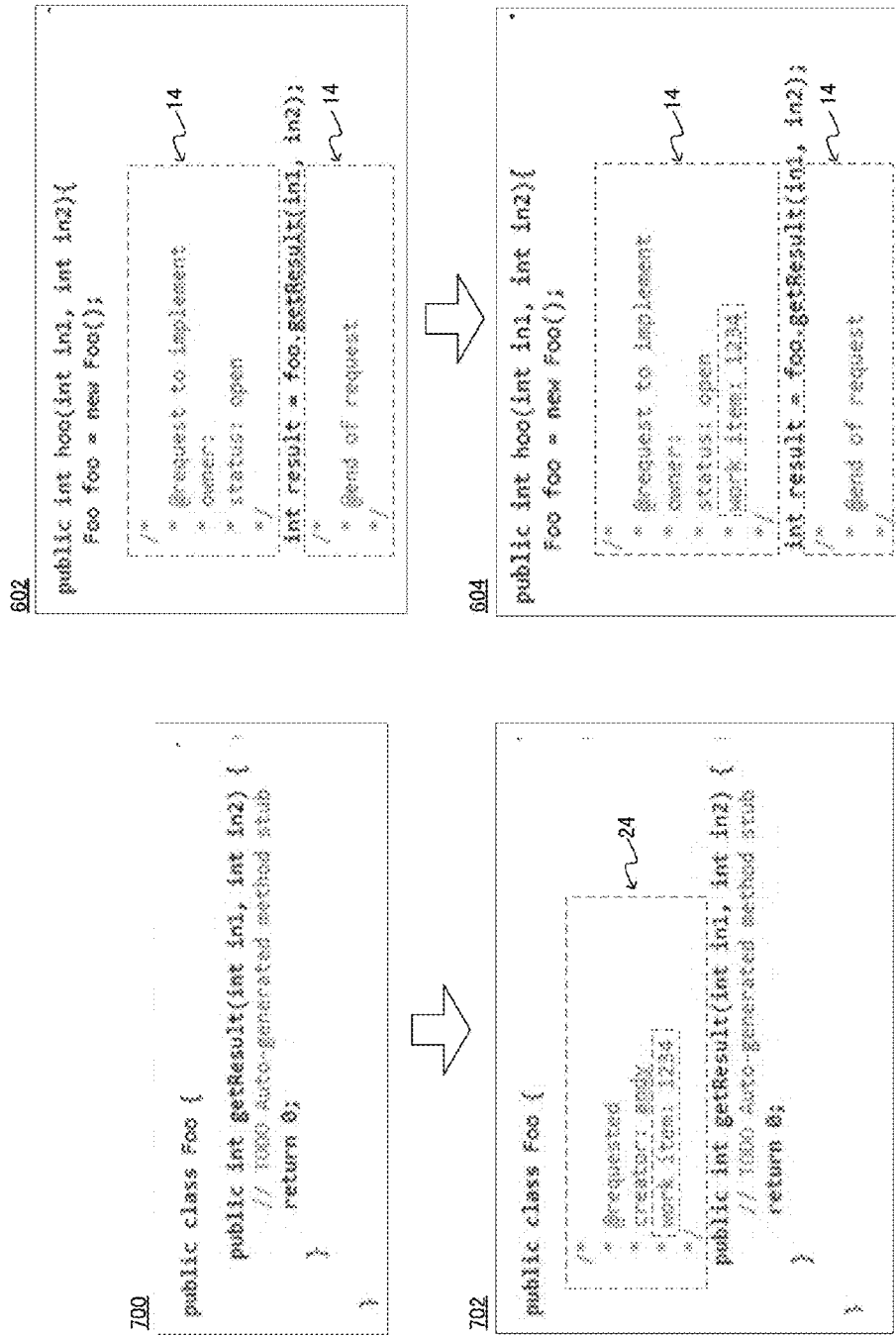
FIG. 8 is a drawing that shows the stub code and working code into which an annotation has been inserted.

FIG. 8 (a) shows stub code 702 for which the differences information has been updated. As shown in FIG. 8 (a), annotation 24 has been inserted into stub code 702. Within annotation 24, a text string, "@requested" for example, has been described as the identifier, there are displayed as properties a task ID (work item) and the creator who required the implementation of the temporary interface, and there have been set the values "andy" and "1234" for those respective properties.

On the other hand, FIG. 8 (b) shows working code 604 (working code D') for which the differences information has been updated. As shown in FIG. 8 (b), within annotation 14 of working code 604 there is newly displayed a task ID (work item) as a property, and "1234" has been set as the value.

The following section continues the description by returning to FIG. 7. At this time, "andy" executes synchronization processing with common repository 302 (S9). The result is that working code 604 (working code D') is copied locally to "andy". (Hereafter, synchronization processing with common repository 302 is called check-out.) "andy" confirms that task ID "1234" has been specified in annotation 14 of working code 604 (working code D') displayed in the operation window, and thereby learns that an implementation task for function "getResult" has been registered.

Figure 9:
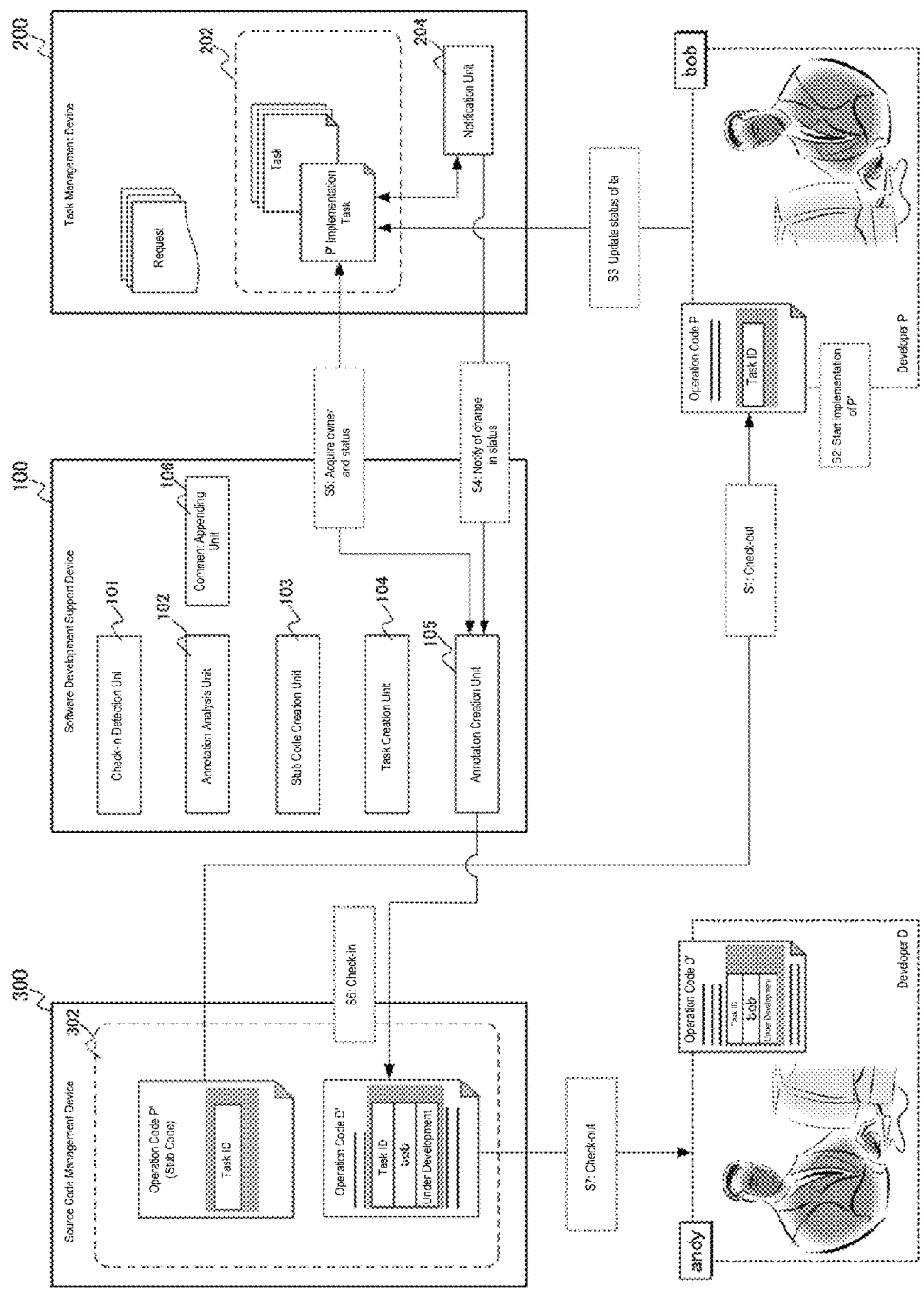
FIG. 9 is a concept drawing for explaining the functions of the software development support device of this embodiment.

The following section continues the description by referencing FIG. 9. "bob", who is the implementation owner for working code P', receives a notification from task management device 200, checks out using stub code 702 (S1), and then starts implementation of working code P' (S2). At this time, "bob" updates the status of P' implementation task, managed by task management device 200, from "open" to "in progress" (S3).

In response to the status being updated for P' implementation task, notification unit 204 of task management device 200 notifies software development support device 100, registered as the P' implementation task related entity, that the status of P' implementation task has been updated (S4). Annotation creation unit 105 of software development support device 100, which has received the notification, acquires the owner information and the status information for P' implementation task from task management device 200 (S5), and updates the "owner" property and the "status" property of annotation 14 based on the acquired information.

Specifically, annotation creation unit 105 sets "bob" for the "owner" property of annotation 14 of working code 604 (working code D') of "andy", based on the information acquired from task management device 200, and, after the "status" property has been overwritten from "open" to "in progress", it checks into common repository 302 using working code 606 (working code D') that has revised annotation 14 (S6). The result is that the differences information is updated.

Figure 10:
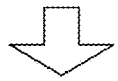
FIG. 10 is a drawing that shows the working code into which an annotation has been inserted.

FIG. 10 shows working code 606 for which the differences information has been updated. As shown in FIG. 10, within annotation 14 of working code 606, "bob" has been set for the "owner" property and "in progress" has been set for the "status" property.

The following section continues the description by returning to FIG. 9. At this time, when "andy" checks out (S7), working code 606 (working code D') is displayed in the operation window. "andy" confirms that "owner: bob" and "status: in progress" has been described in annotation 14 of working code D', and thereby learns that an implementation task for function "getResult" has been started by "bob".

Figure 11:
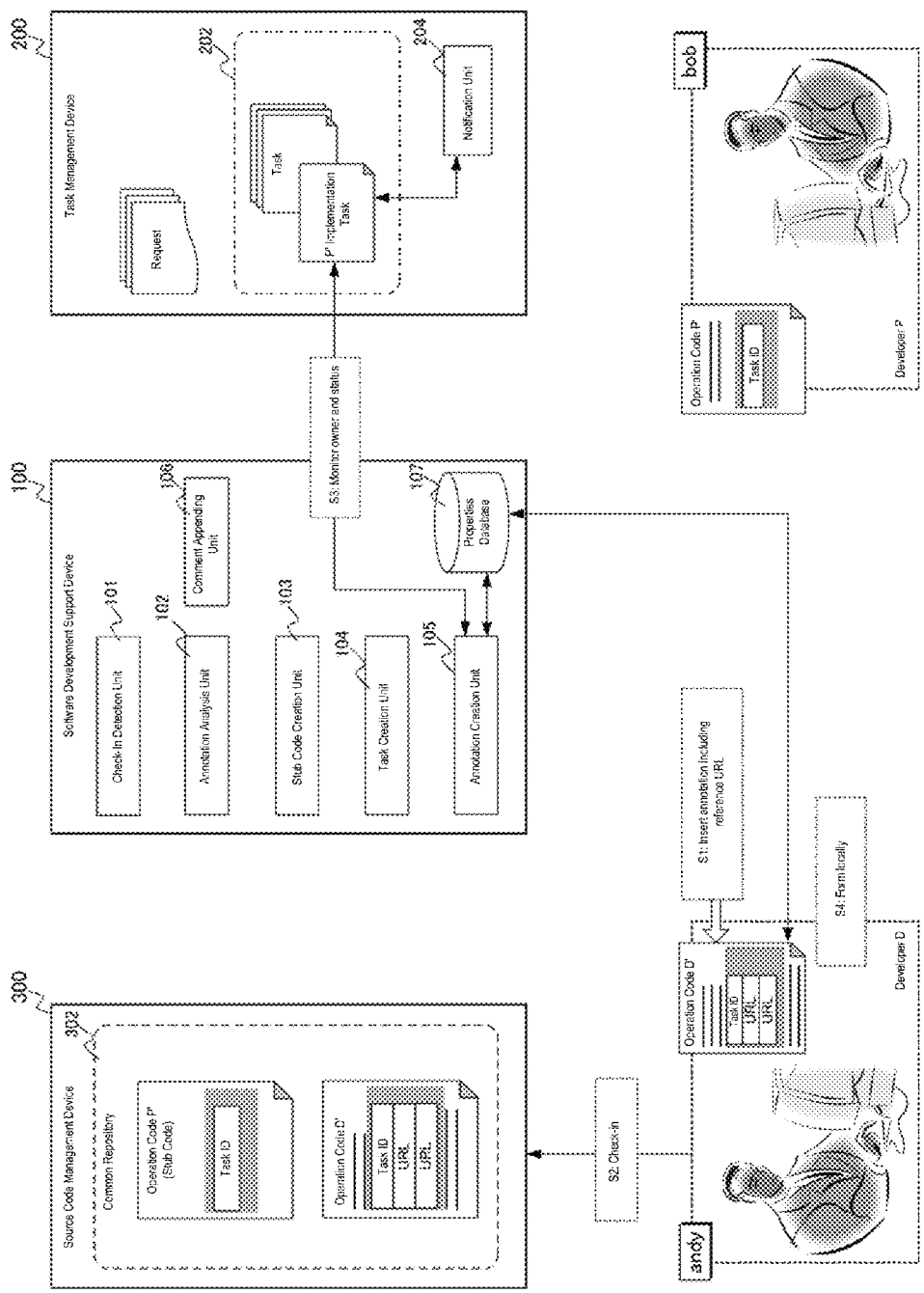
FIG. 11 is a concept drawing for explaining the functions of the software development support device of this embodiment.

The above section described processing that updates properties (owner and status) of the annotation, but the following section describes a different method of processing for updating the properties of the annotation, based on FIG. 11.

With the embodiment shown in FIG. 11, "andy" inserts a prescribed annotation to working code D' by using a prescribed UI offered by software development support device 100 (S1).

At this time, in the region that describes the properties within the annotation, there is automatically described a URL for referencing the property values, as shown with the example below.

owner: ${taskurl}/owner
status: ${taskurl}/status

"andy" checks in using working code D' into which the annotation has been inserted (S2). Thereafter, the procedure that creates the stub code at common repository 302 and registers the P' implementation task at task management device 200 is the same as described above, and therefore an explanation is omitted.

With this embodiment, annotation creation unit 105 continuously monitors tasks registered at task management device 200 (S3), and it uses properties database 107 to manage the update content for owner and status of the corresponding task by linking it to a reference URL described in the annotation in which the task ID of the corresponding task is embedded. Then, each time "andy" opens working code D' locally, the client of "andy" reads, to properties database 107, the update content of the properties (owner and status) at the reference URL described within working code D', forms the read out property information within the annotation on the client side, and displays the information to the user.

Figure 12:
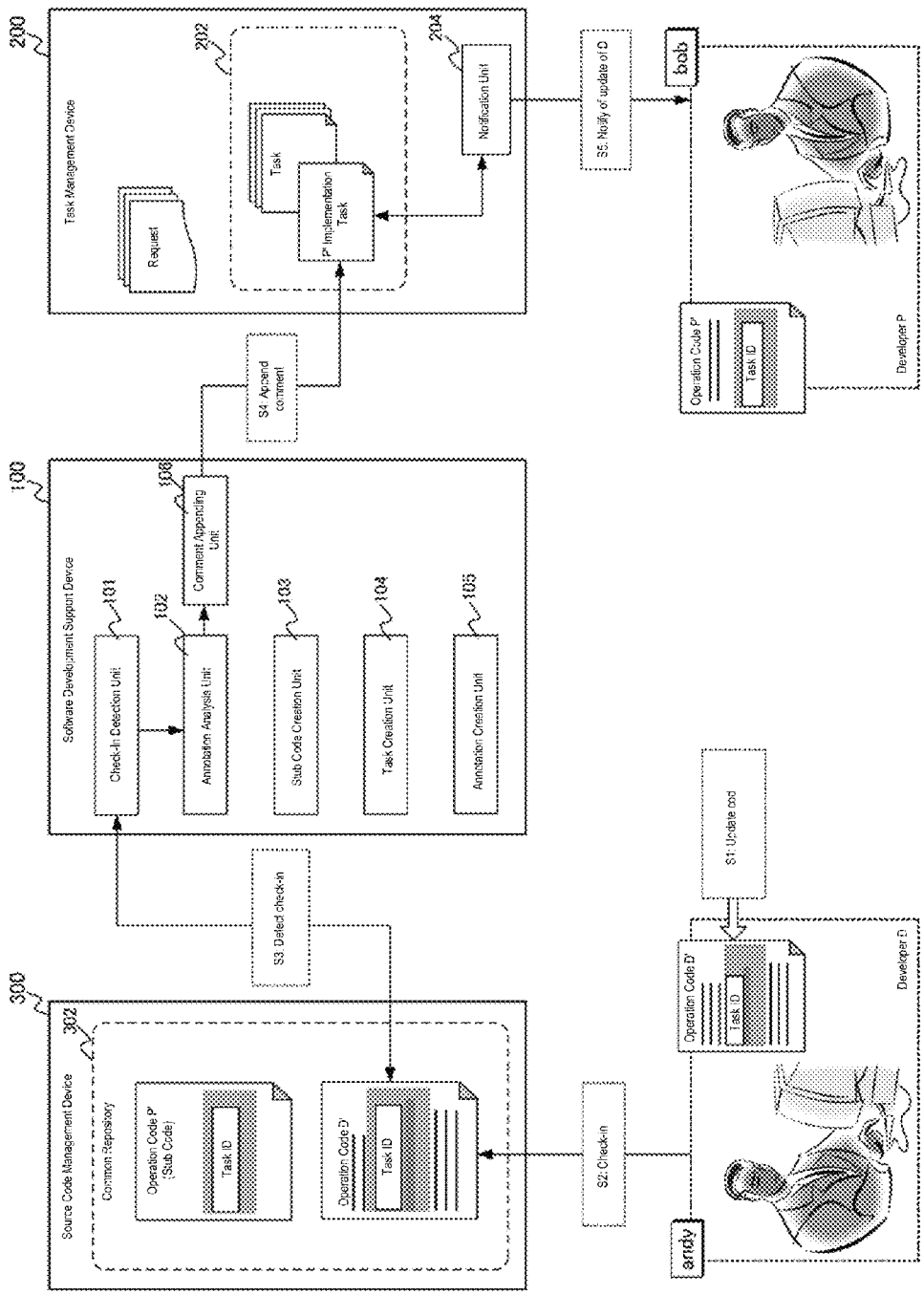
FIG. 12 is a concept drawing for explaining the functions of the software development support device of this embodiment.

The following section continues the description by referencing FIG. 12. "andy", the developer of component D, changes the code related to working code D' (S1). Here, the change of the code related to working code D' signifies a change in the method by which working code D' is described, for example, and additional processing that follows the call of "foo.getResult( )" corresponds to this.

"andy" checks into common repository 302 using the file that has changed the code related to working code D' (S2). Check-in detection unit 101 of software development support device 100 detects the check-in of "andy" and acquires (copies) that file (S3).

Annotation analysis unit 102 analyzes working code D' included in the file acquired by check-in detection unit 101, and it judges whether or not a task ID is described within inserted annotation 14. In this case, task ID "1234" is described in working code D', and therefore annotation analysis unit 102 notifies comment append unit 106 of task ID "1234" and requests creation of a comment.

In response to the request from annotation analysis unit 102, comment append unit 106 analyzes working code D' acquired by check-in detection unit 101 and creates a comment that includes the changed content (a difference in code, for example) of the file. Thereafter, comment append unit 106 appends the created comment to the task that possesses the notified task ID "1234" (S4). In this case, a comment is appended to P' implementation task, which is managed by task management device 200.

In response to a comment having been appended to P' implementation task, notification unit 204 of task management device 200 notifies "bob", who is the owner of P' implementation task, of the comment (S5). Based on the progress status of component D shown in this comment, "bob" learns that he must accelerate his own work pace.

Figure 13:
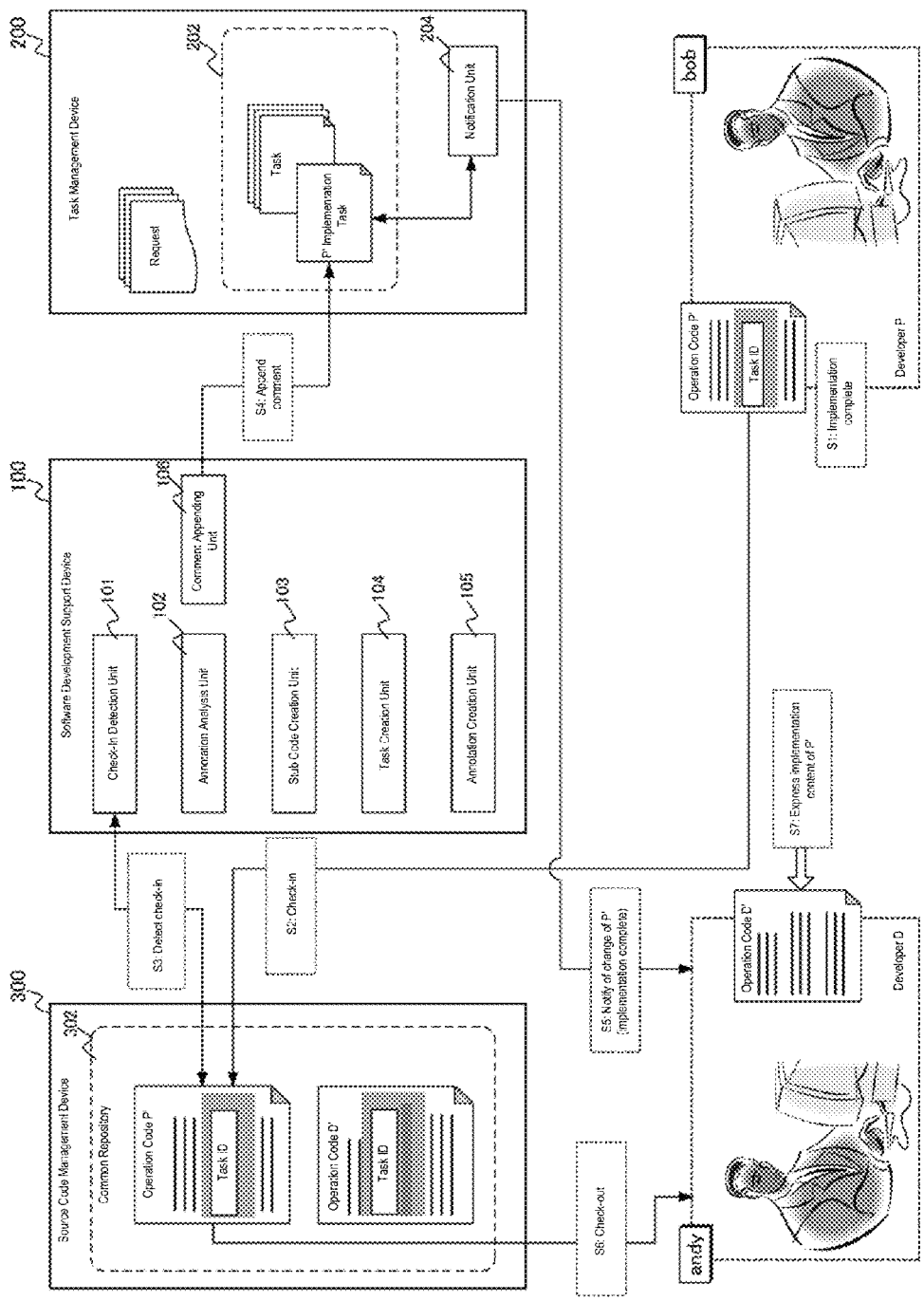
FIG. 13 is a concept drawing for explaining the functions of the software development support device of this embodiment.

The following section continues the description by referencing FIG. 13. When "bob" completes implementation of working code P' (S1), he checks in to common repository 302 using working code P' (S2). FIG. 14 shows working code 703 that implements temporary interface 12. Check-in detection unit 101 of software development support device 100 detects the check-in of "bob" and acquires (copies) that working code 703 (S3).

Annotation analysis unit 102 analyzes working code 703 acquired by check-in detection unit 101, and it judges whether or not a task ID is described within inserted annotation 14. In this case, task ID "1234" is described in working code 703, and therefore annotation analysis unit 102 notifies comment append unit 106 of task ID "1234" and requests creation of a comment.

In response to the request from annotation analysis unit 102, comment append unit 106 analyzes working code 703 acquired by check-in detection unit 101 and creates a comment that includes the changed content (a difference in code, for example) of the working code 703. Thereafter, comment append unit 106 appends the created comment to the task that possesses the task ID "1234" that was notified by annotation analysis unit 102 (S4). In this case, a comment is appended to P' implementation task, which is managed by task management device 200.

In response to a comment having been appended to P' implementation task, notification unit 204 of task management device 200 notifies "andy", who is the related person of P' implementation task, of the comment (S5). "andy", who has learned from the content of the comment that implementation of the function "getResult" has been completed, checks out of common repository 302 using implementation complete working code P' (S6). "andy" makes his own change to the content of checked out working code P' to reflect working code D', and thereby completes component D (S7).

Figure 15:
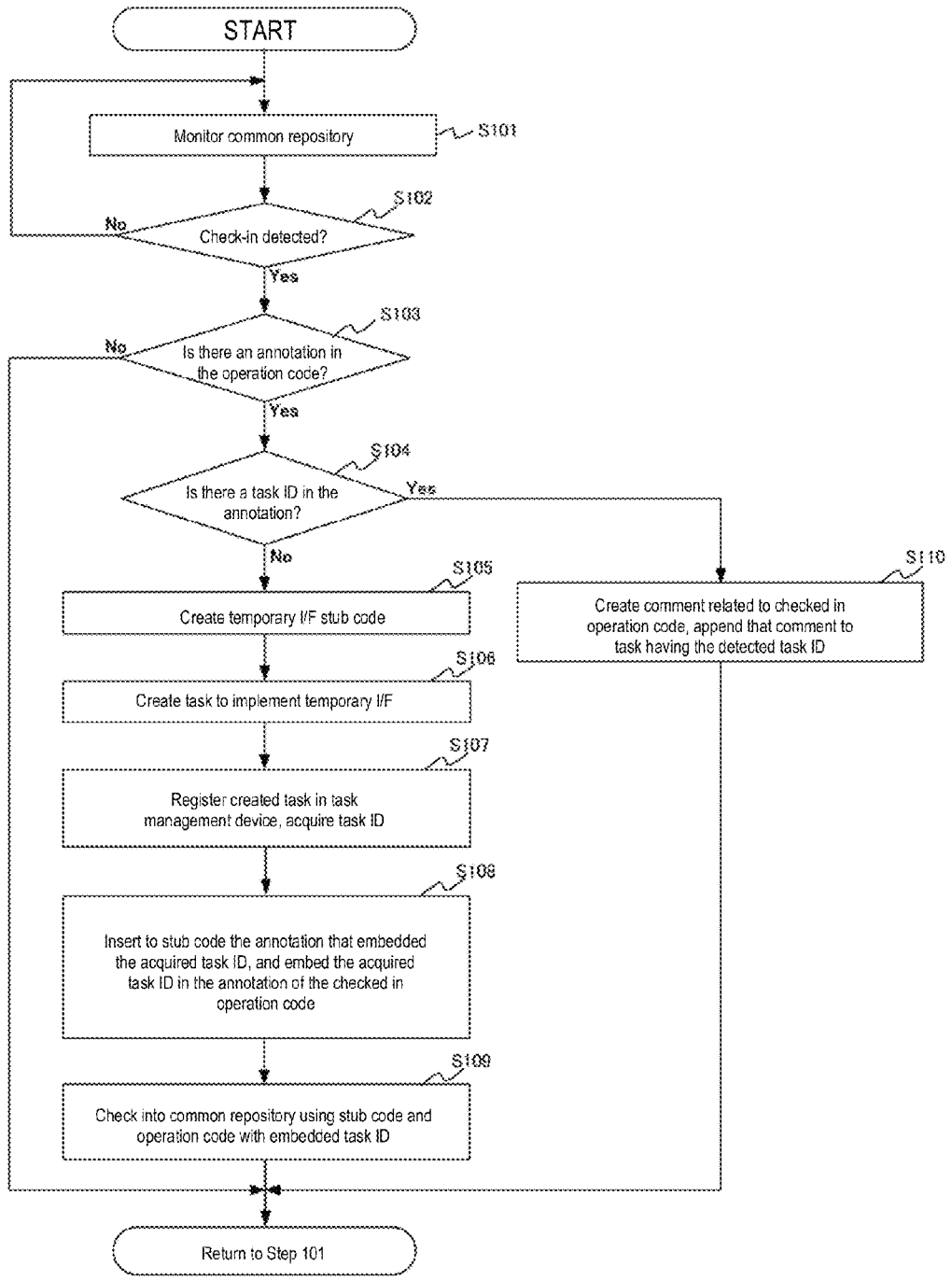
FIG. 15 is a flow chart that shows the processing executed by the software development support device of this embodiment.

The above section described the procedure executed at software development system 1000 that includes software development support device 100 of this embodiment, but the execution by software development support device 100 of this embodiment is next described based on the flow chart shown in FIG. 15.

When software development support device 100 starts, monitoring of common repository 302 is started (Step 101). If check-in to common repository 302 is detected (Yes at Step 102), the checked in working code is analyzed and there is judging of whether or not a prescribed annotation has been inserted (Step 103).

At Step 103, when it has been judged that the prescribed annotation has not been inserted (No at Step 103), the process returns to Step 101 and monitoring of common repository 302 continues. Conversely, when it has been judged that the prescribed annotation has been inserted (Yes at Step 103), the process advances to Step 104.

At Step 104 there is judging of whether or not a task ID has been described in the annotation. When it has been judged that a task ID has not been described (No at Step 104), the temporary interface is extracted from within the working code, there is formed a stub code for the implementation class (Step 105), and the process advances to Step 106.

At Step 106, an operation task for implementing the temporary interface is created. Thereafter, the created operation task is registered in task management device 200, the task ID for the corresponding task is acquired (Step 107), and the process advances to Step 108.

At Step 108, the annotation, into which has been embedded the acquired task ID, is inserted into the stub code created at Step 105, the acquired task ID is embedded in the annotation of the working code detected at Step 102, and the process advances to Step 109.

At Step 109, the working code and the stub code into which the same task ID has been embedded are checked into common repository 302. Thereafter, the process returns to Step 101, and monitoring of common repository 302 starts again.

Conversely, when at Step 104 it has been judged that a task ID has been described in the annotation (Yes at Step 104), there is created a comment related to the checked in working code, and the created comment is appended to the operation task within task management device 200, which holds the described task ID (S110). Thereafter, the process returns to Step 101 and monitoring of common repository 302 starts again.

By use of this invention, as described above, communications between interdependent developers are systematically executed using as a key the annotation inserted to the working code of the dependent. In general, companion developers in the interdependent relationship are mutually conscious of operation start at the outset, but there is a tendency to gradually neglect the operations with the passing of time, and there arises a propensity to forget needed communications and notifications. Regarding this point, by use of this invention, a developer in an interdependent relationship is able to learn by automatic support the reciprocal status within the working code, and this allows each developer to concentrate on his or her own work.

The above section described an embodiment of this invention, but the invention is not limited to the above described embodiment, and there is included within the scope of this invention that which produces the operation and effect of the invention with the scope of embodiments which an appropriately skilled person could surmise.

Furthermore, between above described task management device 200, source code management device 300, and software development support device 100, there can be used a transaction protocol such as TCP/IP, and these can be reciprocally connected using the HTTP protocol or a distributed computing environment such as RMI (Remote Method Invocation), RPC (Remote Procedure Call), EJB (Enterprise Java™ Beans), or CORBA (Common Object Broker Architecture). Moreover, each device can implement JDBC (Java™ Database Component) or another interface to connect the databases, providing access to databases of such as MySQL, DB2, Oracle™, Postage SQL, SQL Server, or Access. Otherwise, each device can implement a web browser and share processing through a server program implemented by using a language such as CGI, JAVA™, PERL, or RUBY. Additionally, each device can be implemented by a personal computer, work station, or server, each device can be loaded with a single core processor or multi-core processor of any type, and the environment can be implemented by a suitable operating system such as Windows™, UNIX™, or LINUX™.

Each function of the above described embodiment can be realized by a device executable program described in an object oriented programming language such as C, C++, C# or JAVA™, and the program of this embodiment can be stored and distributed on a device readable recording medium such as CD-ROM, MO, DVD, flexible disc, EEPROM, or EPROM, or the program can be transferred through a device capable network.

What is claimed is:

1. A system for supporting communications between developers of interdependent tasks of software parallel development, the system comprising:
    a processor programmed to initiate executable operations comprising:
        detecting a source code checked into a common repository that centrally manages source code under development;
        judging whether or not a prescribed annotation has been inserted into the checked in source code;
        creating a stub code corresponding to a temporary interface described in the source code into which the prescribed annotation has been inserted, and checking into the common repository;
        creating a task to implement the temporary interface and to register the task with a task management device that manages parallel development tasks, and acquiring a task ID of the task from the task management device;
        inserting a prescribed annotation describing the task ID acquired from the task management device to the stub code, and describing the task ID in the annotation that has been inserted in the checked in source code; and
        appending a comment, related to the source code, to the task that has the task ID described in the annotation of the checked in source code.

2. The system according to claim 1, wherein
    the temporary interface included in the checked in source code is temporary code for calling other source code in an interdependent relationship with the source code.

3. The system according to claim 1, wherein
    an owner and a status of the task implemented by the temporary interface are properties described in the annotation inserted to the checked in source code, wherein the processor initiates a further executable operation comprising:
acquiring, from the task management device, information related to the owner and status of a task having a task ID described in the annotation, and updating properties recorded in the annotation based on the acquired information.

4. The system according to claim 1, wherein
an owner and a status of the task implemented by the temporary interface are properties described in the annotation inserted to the checked in source code, and a URL is described for referencing the property value of each property, wherein
the processor initiates a further executable operation comprising:
acquiring, from the task management device, information related to the owner and status of a task having a task ID described in the annotation, and linking the information as a property value to a URL.

5. A method of supporting communications between developers of interdependent tasks of software parallel development, comprising:
detecting a source code checked into a common repository that centrally manages source code under development;
judging whether or not a prescribed annotation has been inserted into the checked in source code;
creating, using a processor, a stub code corresponding to a temporary interface described in the source code into which the prescribed annotation has been inserted, and checking into the common repository;
creating a task to implement the temporary interface and to register the task with a task management device that manages parallel development tasks, and acquiring a task ID of the task from the task management device;
inserting a prescribed annotation describing the task ID acquired from the task management device to the stub code, and describing the task ID in the annotation that has been inserted in the checked in source code; and
appending a comment, related to the source code, to the task that has the task ID described in the annotation of the checked in source code.

6. The method according to claim 5, wherein
the temporary interface included in the checked in source code is temporary code for calling other source code in an interdependent relationship with the source code.

7. The method according to claim 5, wherein
an owner and a status of the task implemented by the temporary interface are properties described in the annotation inserted to the checked in source code, the method further comprising:
acquiring, from the task management device, information related to the owner and status of a task having a task ID described in the annotation, and updating properties recorded in the annotation based on the acquired information.

8. The method according to claim 5, wherein
an owner and a status of the task implemented by the temporary interface are properties described in the annotation inserted to the checked in source code, and a URL is described for referencing the property value of each property, the method further comprising:
acquiring, from the task management device, information related to the owner and status of a task having a task ID described in the annotation, and linking the information as a property value to a URL.

9. A computer program product for supporting communications between developers of interdependent tasks of software parallel development, comprising:
a computer readable storage device having program code stored thereon, the program code executable by a processor to perform:
detecting, using the processor, a source code checked into a common repository that centrally manages source code under development;
judging, using the processor, whether or not a prescribed annotation has been inserted into the checked in source code;
creating, using the processor, a stub code corresponding to a temporary interface described in the source code into which the prescribed annotation has been inserted, and checking into the common repository;
creating, using the processor, a task to implement the temporary interface and to register the task with a task management device that manages parallel development tasks, and acquiring a task ID of the task from the task management device;
inserting, using the processor, a prescribed annotation describing the task ID acquired from the task management device to the stub code, and describing the task ID in the annotation that has been inserted in the checked in source code; and
appending, using the processor, a comment, related to the source code, to the task that has the task ID described in the annotation of the checked in source code, wherein the computer readable storage device is not a transitory signal per se.

10. The computer program product according to claim 9, wherein
the temporary interface included in the checked in source code is temporary code for calling other source code in an interdependent relationship with the source code.

11. The computer program product according to claim 9, wherein
an owner and a status of the task implemented by the temporary interface are properties described in the annotation inserted to the checked in source code, the method further comprising:
acquiring, from the task management device, information related to the owner and status of a task having a task ID described in the annotation, and updating properties recorded in the annotation based on the acquired information.

12. The computer program product according to claim 9, wherein
an owner and a status of the task implemented by the temporary interface are properties described in the annotation inserted to the checked in source code, and a URL is described for referencing the property value of each property, the method further comprising:
acquiring, from the task management device, information related to the owner and status of a task having a task ID described in the annotation, and linking the information as a property value to a URL.

* * * * *